(12) United States Patent
O'Connor

(10) Patent No.: US 6,330,030 B1
(45) Date of Patent: Dec. 11, 2001

(54) DIGITAL IMAGE SENSOR WITH LOW DEVICE COUNT PER PIXEL ANALOG-TO-DIGITAL CONVERSION

(75) Inventor: Dennis M. O'Connor, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/002,897

(22) Filed: Jan. 5, 1998

(51) Int. Cl.[7] ..................................................... H04N 5/335
(52) U.S. Cl. ........................................... 348/297; 348/308
(58) Field of Search ..................................... 348/207, 294, 348/297, 298, 302, 307, 308, 309, 311, 312; 250/208.1; H04N 5/335

(56) References Cited

U.S. PATENT DOCUMENTS 5,565,915 * 10/1996 Kindo et al. ........................... 348/308
5,693,932 * 12/1997 Ueno et al. ........................... 348/308

* cited by examiner

*Primary Examiner*—Tuan Ho
(74) *Attorney, Agent, or Firm*—Blakely, Sokoloff, Taylor & Zafman LLP

(57) ABSTRACT

A method has the first step of accumulating charge in a photo sensor to arrive at a photo sensor voltage. Then, the method increments a value in a counter and determines whether the photo sensor voltage is less than a reference voltage. If the photo sensor voltage is less than the reference voltage, then load a memory with the value in the counter. An apparatus has a photo sensor; a comparator coupled to the photo sensor; a switching element coupled to the photo sensor; an AND-gate coupled to the comparator; and a memory coupled to the AND-gate.

13 Claims, 3 Drawing Sheets

DIGITAL IMAGE SENSOR WITH LOW DEVICE COUNT PER PIXEL ANALOG-TO-DIGITAL CONVERSION

BACKGROUND

1. Field of the Invention

The present invention relates to the field of use of digital image capturing. More particularly, the present invention relates to image sensors with built-in analog-to-digital converters.

2. Description of Related Art

Typically, imaging sensor arrays have separate analog-to-digital (A/D) circuits which are located off of the array to digitize the captured pixels. The array is composed of a grid of pixel sensors, each pixel sensor generating a charge when the pixel sensor is exposed to a light source to which it is directed.

During operation, the array first captures the image by having each pixel sensor generating and storing an amount of charge corresponding to the amount of light it is exposed to. Then, the array sends the charge stored in each pixel sensor to the A/D circuit over an analog transfer circuit. The A/D circuit then produces a digital representation of the amount of charge received from the pixel sensor.

As the A/D circuit is often located some distance away from the array, the length of the analog lines which are used to send the analog pixel data between the array and the A/D circuit are quite long. As the length of the analog lines is increased, noise and power effects must be taken into consideration to avoid the loss or degradation of the captured signals.

Due to noise considerations, the number of analog lines used to transfer pixel signals from the array to the A/D circuit may be limited to avoid cross-talk or any of the other problems which are caused by interference between these signal lines. Additionally, if multiple independent A/D circuits are used, mismatches between them can cause undesirable artifacts in the resulting image. Therefore, the pixels in an array are typically digitized by transferring each pixel's charge sequentially to a single A/D circuit. In color sensors, where the array may be considered to consist of several sub-arrays each corresponding to a particular color channel, each color channel may have a single A/D circuit.

It would be desirable to eliminate the difficulties involved in accurately transferring the accumulated charge in each pixel to the A/D circuit. It may also sometimes be desirable to perform some amount of highly-parallel digital processing on the captured image before outputting it from the sensor—also known as digital focal-plane processing.

One method of accomplishing accurate transfers and parallel pixel on-sensor processing would be to perform the analog to digital conversion within the circuitry of each pixel However, to accomplish A/D conversion within the circuit of each pixel would require each pixel to have its own A/D circuit and, thus requiring the building of a conventional A/D circuit and increasing the cost of each pixel.

Thus, it would be desirable to be able to accomplish A/D conversion within a pixel without requiring each pixel to have the extra circuitry and cost associated with conventional A/D circuits.

SUMMARY

In one embodiment, a method has the first step of accumulating charge in a photo sensor to arrive at a photo sensor voltage. Then, the method increments a value in a counter and determines whether the photo sensor voltage is less than a reference voltage. If the photo sensor voltage is less than the reference voltage, then load a memory with the value in the counter. What is also disclosed is an apparatus having a photo sensor; a comparator coupled to the photo sensor; a switching element coupled to the photo sensor; an AND-gate coupled to the comparator; and a memory coupled to the AND-gate.

DETAILED DESCRIPTION

To digitize all pixels of a sensor array simultaneously, a system is provided which will allow each photo sensor in the sensor array to generate a digital value based on the amount of time needed to reach a certain level of charge in the photo sensor, as expressed by the output voltage of the photo sensor. Each pixel of an image captured by the sensor array will be processed by a dedicated pixel capture circuit. The system will be scalable to provide as many pixels to be captured simultaneous in the sensor array as desired in an implementation, thereby allowing the creation of image capturing devices with a high-degree of resolution.

Figure 1:
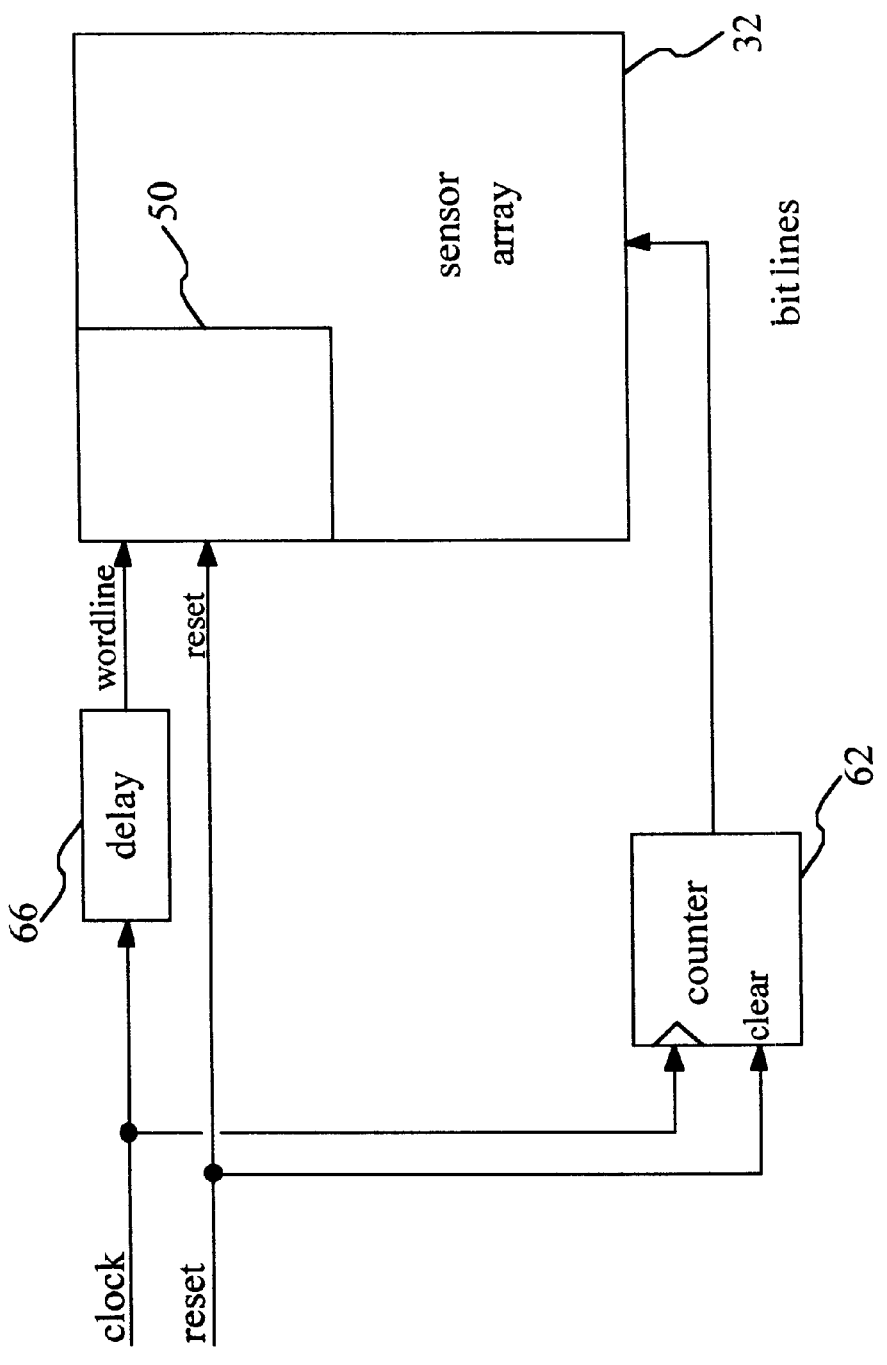
FIG. 1 is a block diagram of an image capture circuit configured in accordance with one preferred embodiment of the present invention.

FIG. 1 is a diagram of an image capture circuit 30 containing an image sensor 32 having a plurality of pixel capture circuits 50 which are configured in accordance with a preferred embodiment of the present invention. Coupled to pixel capture circuit 50 is a counter 62, and a delay circuit 66.

Pixel capture circuit 50 is representative of all the other pixel capture circuits (not shown) in image sensor 32. What is described for pixel capture circuit 50 applies to all the pixel capture circuits contained in image sensor 32. For example, the control signals described below as being provided to pixel capture circuit 50 are provided to all the other pixel capture circuits in image sensor 32.

Image capture circuit 30 is contained in a digital imaging device, such as a camera or an image scanner. In a preferred embodiment, image capture circuit 30 receives as inputs, a RESET signal and a CLOCK (CLK) signal which control the image capture and analog to digital conversion.

For output, the converted values stored in the sensor array may be read out in the same manner used for conventional DRAM arrays. For example, an address is provided which is decoded to drive a particular WordLine, which selects a particular pixel or a set of pixels. The selected pixel or set of pixels then outputs the value stored within the pixel or pixels to bit lines that are arranged throughout the sensor array.

Not shown in FIG. 1 are the circuits needed to drive individual word lines in response to an address, as would be necessary for read, write or refresh operations on the digital data stored in the DRAM cells. This would include an address decoder with an output enable, the output of which would be logically-OR'd with the WordLine signal that is the output of delay circuit 66. Also not shown are the sense-amps, bit line drivers and other control circuits used for reading, writing and refreshing the DRAM cells. These circuits are the circuits which are used with standard DRAM cells.

Figure 2:
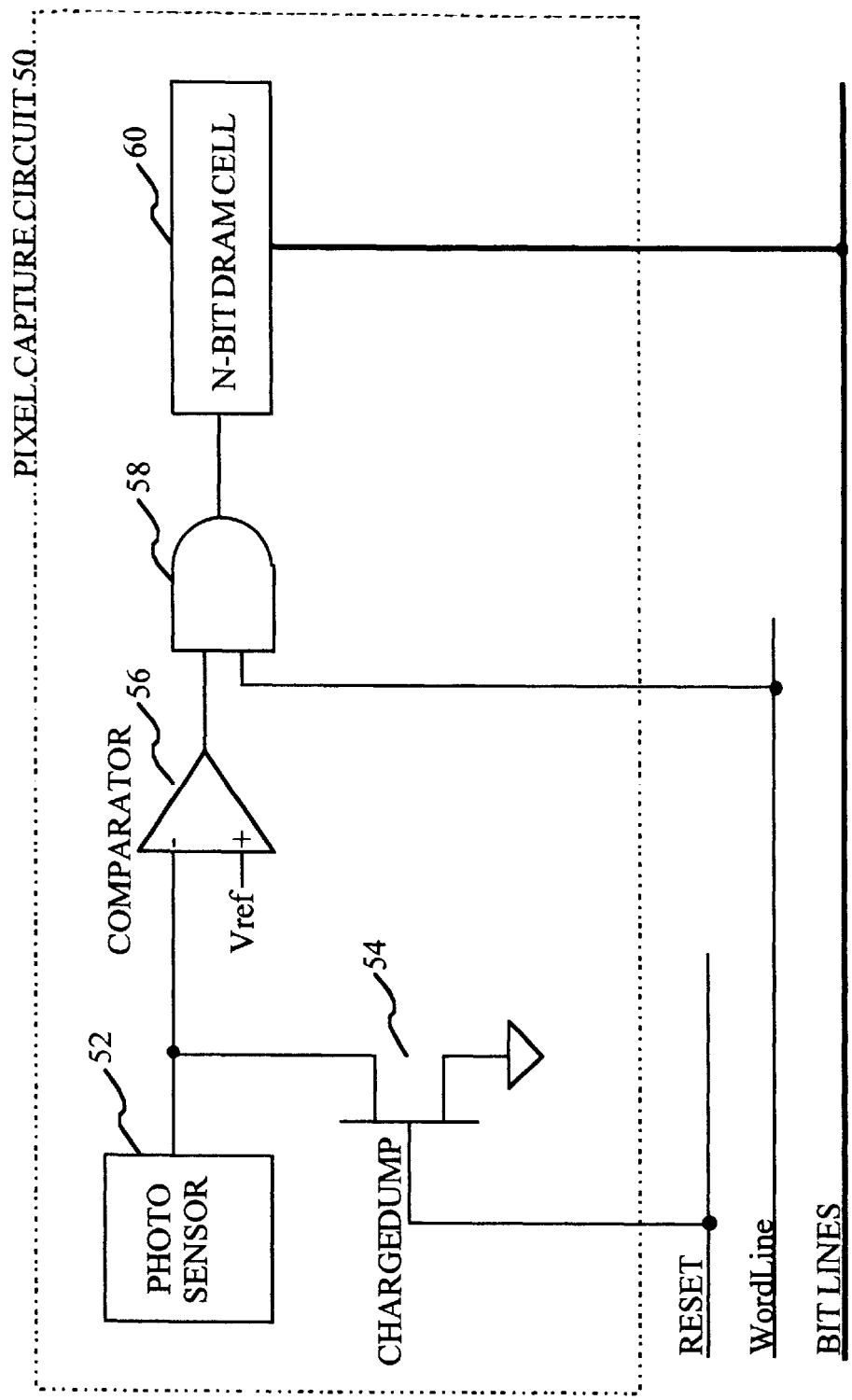
FIG. 2 illustrates a pixel capture circuit, which is contained in the image capture circuit, configured in accordance with one preferred embodiment of the present invention.

FIG. 2 is a block diagram of pixel capture circuit 50, which includes a photo sensor 52, a charge dump transistor 54, a comparator 56, an AND gate 58, and a N-bit dynamic random access memory (DRAM) cell 60. Comparator 56, AND gate 58 and N-bit DRAM cell 60 form the in-pixel elements of the analog-to-digital (A/D) converter. Coupled to the bit lines of N-bit DRAM cell 60 is the output of counter 62. Comparator 56 is shown coupled to a fixed Vref. This Vref may be either a fixed voltage generated by a power circuit (not shown) within the pixel capture circuit, or a voltage generated by a power circuit (not shown) outside of the pixel capture circuit 50, or a voltage inherent in the construction of the comparator 56 itself, such as a threshold voltage for a transistor. Whatever the source of Vref, it does not vary significantly during image capture and conversion, and its value should not differ substantially from one instance of pixel capture circuit 50 to another. Lastly, coupled to the input of AND gate 58 is the output of delay circuit 66.

Photo sensor 52 is made up of a photoelectric device and a storage capacitor. Typically, this is a photodiode and its intrinsic capacitance. In one preferred embodiment, this is a CMOS sensor.

Charge dump transistor 54 is coupled to photo sensor 52 to allow the draining and resetting of the charge contained in photo sensor 52. Charge dump transistor 54, as shown, effectively grounds photo sensor 52 when it receives a signal on a Reset Array signal line which is connected to charge dump transistor 54. Alternatively, charge dump transistor 54 could be connected to a fixed voltage source such as the power supply. In the former case, photons cause charge to accumulate on a storage capacitor of photo sensor 52, causing its output voltage to rise when charge dump transistor 54 is not active. In the latter, photons cause charge to decrease in the storage capacitor of photo sensor 52, causing its output voltage to decrease when the charge dump transistor 54 is not active. Either configuration can be used with this invention—if having charge dump transistor 54 connect to a positive supply voltage is chosen, then the inputs of comparator 56 would be switched. In one preferred embodiment, charge dump transistor 54 is a switching device.

Comparator 56 receives the output of photo sensor 52 and is used in the determination of the digital representation of the illumination level for photo sensor 52. In one preferred embodiment, comparator 56 is a voltage comparator which will compare the voltage at the output of photo sensor 52 and the reference voltage Vref. In another embodiment, comparator 56 may be a single input buffer with digital output and a well-defined switching voltage, such as a inverting or non-inverting Schmidt trigger.

During digitization, AND gate 58 is used to control when N-bit DRAM cell 60 is to load a new value from the output of counter 62. AND gate 58 takes as input the output of comparator 56 and a WordLine signal and performs a logical-AND operation. The output of AND gate 58 will be sent to the LOAD input of N-bit DRAM cell 60. When comparator 56 and the WordLine are both logical ones, then AND gate 58 will output a logical one, which will cause N-bit DRAM cell 60 to connect its bit cells to the bit lines. Since the bit lines are being driven with the value being output by counter 62, this will load the value which is output from counter 62 into N-bit DRAM cell 60. Note that when digitization is not in progress, the output of AND gate 58 is used to control the reading and writing of DRAM cell 60. To accomplish this, the output of comparator 56 must be a logical 1. This can be ensured in the circuit shown by activating the charge dump transistor so that the output of the photo sensor 52 drops below Vref. In another embodiment, an two input OR gate could inserted between comparator 56 and AND gate 58, with the remaining input of the OR gate attached to a signal that was routed to all instances of pixel capture circuit 50. In this alternate embodiment, a logical 0 on the new control signal would allow the digitization process to occur, while a logical 1 on the new control signal would allow conventional reading and writing of N bit DRAM cell 60.

Figure 3:
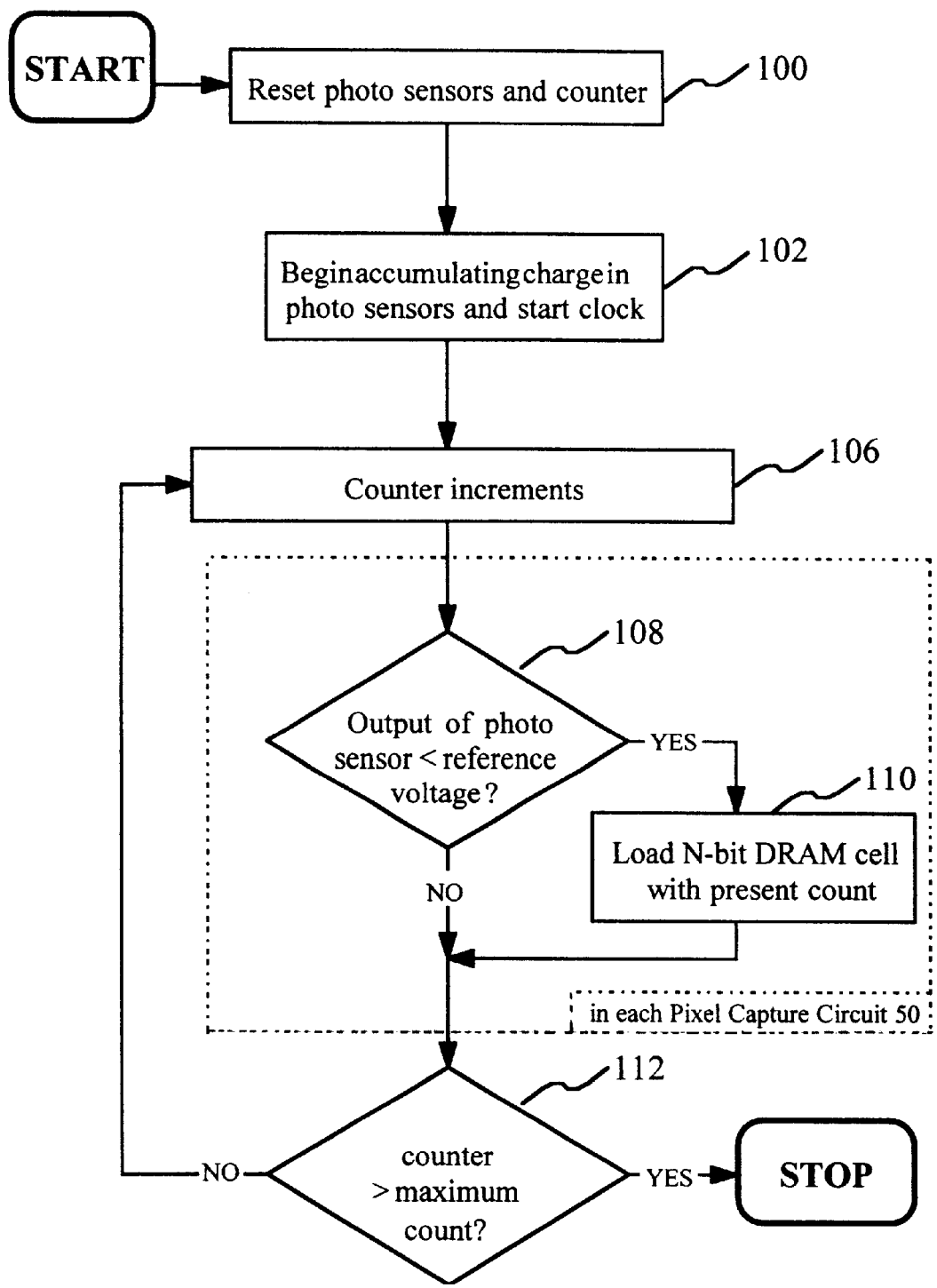
FIG. 3 is a flow diagram describing the operation of the image capture circuit with the pixel capture circuit.

N-bit DRAM cell 60 is used to store the digital representation of the captured photo sensor signal. Specifically, the value stored in N-bit DRAM cell 60 is the digital representation of the time required for the total number of photons detected by photo sensor 52 during the current exposure to reach a set threshold. This value will be proportional to the inverse of the intensity of the illumination of photo sensor 52: the brighter the illumination of photo sensor 52, the less time will pass before the threshold level is reached. FIG. 3 discusses how this value is determined. In an alternative embodiment, counter 62 may be clocked in such a manner as to cause the value stored in n-bit DRAM cell 60 to be proportional to the intensity of the illumination of photo sensor 52. In this alternative embodiment, counter 62 would have to be clocked at a precisely controlled, non-constant, rate.

Counter 62 is coupled to the input of N-bit DRAM cell 60 to supply a value to the pixel, as explained below. In a preferred embodiment, counter 62 is a count-up counter which will count up to the maximum value that can be represented in N-bit DRAM cell 60. In an alternate embodiment, counter 62 can be a counter which can count to a value which is either higher or lower than the maximum value that can be represented in N-bit DRAM cell 60. The size of counter 62 and N-bit DRAM cell 60 is dictated by design requirements. In addition, counter 62 can be implemented as a count-down counter, counting down from the highest value that can be represented in N-bit DRAM cell 60. Alternatively, counter 62 counts down from a value which is higher or lower than the value that can be represented in N-bit DRAM cell 60, as the value that can be represented in counter 62 does not have to be matched to the value that can be represented in N-bit DRAM cell 60. In any of these embodiments, counter 62 can be clocked at a non-constant rate.

Delay circuit 66 is used to add a delay in the loading by N-bit DRAM cell 60 of the output of counter 62 to allow for the output of counter 62 to arrive at a stable state, and for the noise that may be generated by driving the new value into the array to settle out. In one preferred embodiment, delay circuit 66 is a clocked delay circuit using a shift register. In another embodiment, delay circuit 66 is constructed of one or more buffers, each of which adds its intrinsic propagation delay to the signal.

The following pseudo-code illustrates the general operation of image capture circuit 30 and pixel capture circuit 50, where MAX is the largest digital output value for each pixel circuit (for example, if the DRAM cells are 8 bits in size, MAX=255):

```
BEGIN PROGRAM
    Counter = 0;
LOOPTOP:
    for all pixels
        if V_photosensor less_than V_ref then
            N-bit_DRAM := Counter;
        else
            do nothing;
        end if;
    end for;
    Counter := Counter+1;
    if Counter less_than_or_equal_to MAX then
        go to LOOPTOP;
    end if;
END PROGRAM
```

FIG. 3 is a flow diagram of the operation of pixel capture circuit 50 of FIG. 2 in capturing and digitizing a pixel signal. Although the description of the operation of the circuit is limited to capturing a single pixel signal, the description is applicable to capturing multiple pixel signals using either the circuit in FIG. 2 or multiple copies of the circuit in FIG. 2.

In block 100, pixel capture circuit 50 is reset by draining the charge accumulated in photo sensor 52 to ground through the use of charge dump transistor 54. Charge dump transistor 54 will act as a closed switch when it receives a signal from the RESET signal line. During reset, the count contained in counter 62 is also reduced to zero. If at this time the WordLine is asserted, this would cause all the DRAM cells in image capture circuit 30 to be written to zero. Alternatively, the value in the DRAM cells could be set to zero by writing zeros to them by the methods normally employed to write data to DRAM's.

In block 102, the RESET signal is de-asserted. Exposure is thereby initiated and photo sensor 52 begins to acquire a charge as photons from the image to be captured are sensed by it. Clocking of counter 62, and therefor the conversion process, is initiated simultaneously. Conversion of the analog values to digital form occurs during the exposure period. When the exposure is complete, the digital values for each pixel are immediately available. Exposure may be considered complete when the terminal count of counter 62 is reached, since no change in the digitized values will occur after that has occurred. A mechanical, photoelectric or electronic shutter is not required, though one may be used if desired.

As exposure is underway, counter 62 counts, and the output of counter 62 is driven onto the bit lines connected to N-bit DRAM cell 60. At the same time, photons captured by photo sensor 52 cause the charge stored on photo sensor 52 to rise, and the output voltage of photo sensor 52 to rise as a result. As long as the output voltage of photo sensor 52 is less than Vref, the current value of counter 62 will be written into N-bit DRAM cell 60. Once the output voltage of photo sensor 52 exceeds Vref, no further writes to N-bit DRAM cell 60 occur. The final value written into N-bit DRAM cell 60 therefor indicates the amount of time required for the output of photo sensor 52 to reach Vref, which indicates the illumination level of photo sensor 52.

In detail, in block 108, comparator 56 in every pixel will compare Vref and photo sensor 52. If the output of photo sensor 52 is below the $V_{ref}$ value, then operation will then continue with block 110. Otherwise, operation will then continue with block 112.

In block 110, since the output of photo sensor 52 is below the $V_{ref}$, comparator 56 will output a logical one value, which will be fed to AND gate 58. The output of AND gate 58 controls the connection of the charge storage cells within N-bit DRAM cell 60 to the bit lines. N-bit DRAM cell 60 will load the value output by counter 62 when AND gate 58 outputs a logical one and the bit lines are being driven with the output of counter 62. Thus, as long as AND gate 58 is receiving a logical one from comparator 56, N-bit DRAM cell 60 will be loaded with the present count of counter 62 every time the WordLine is asserted.

In a preferred embodiment, the WordLine will be asserted at some offset time from transitions in the output of counter 62, to guarantee that the count value output of counter 62 has settled on the bit lines. To provide this offset, delay circuit 66 is used to delay the assertion of the WordLine.

Thus, whenever Vref is greater than the voltage output by the photo sensor 52, and the WordLine is asserted, a digital value representing the current elapsed exposure time is loaded into the N-bit DRAM cell 60. The last value loaded into N-bit DRAM cell 60 will be value of counter 62 that represents the time interval during which the output voltage of photo sensor 52 exceeded the value of Vref. This is the value that will be available for reading out of N-bit DRAM cell 60 once digitization is complete.

In terms of FIG. 3, this means that within each pixel capture circuit 50, on each iteration, the "YES" branch from block 108 will be taken until the reference voltage is less than the output of the photo sensor 52, and from that point in time onward the "NO" branch will be taken, until the loop encompassing block 106, 108, 110 and 112 ends.

This accomplishes the A/D conversion as N-bit DRAM cell 60 is loaded with a binary value which, assuming that the illumination level of photo sensor 52 is constant during the exposure interval, is inversely proportional to the illumination level of photo sensor 52. The manners by which this inverse-proportional signal may be converted to a conventional intensity value is obvious to one of ordinary skill in the art. It is to be noted for all pixels of sensor array 32, each pixel stops loading values into its DRAM cell when appropriate for each pixel's illumination level.

As shown in block 112, counter 62 does not stop counting until counter 62 reaches either the maximum value that can be represented by counter 62, indicating that the digitization of all the image pixels is complete.

To read the value out after conversion, standard DRAM array read techniques are used. Typically, the bit lines of N-bit DRAM cell 60 are set into a neutral state and left undriven. A word line is then driven to select a set of pixels. These pixels then connect their data storage cells to the bit lines, which causes a change in the state of the bit lines that is detected by sense amps. Note that this is a destructive read operation.

However, the device may amplify the data read out from the pixels and drive it back into the storage cells if desired, as is typically done in DRAM's. Also note that the dynamic nature of the DRAM cells requires that they either be read out before the stored charge within them leaks enough to make reading them unreliable, or that the DRAM cells be periodically refreshed to maintain the data stored in each DRAM cell.

In an alternate embodiment, the DRAM cells could be replaced with SRAM cells. SRAM cells do not need to be periodically refreshed and can be read non-destructively. However, SRAM cells require more transistors and are typically larger than DRAM cells.

This invention may allow a high-yield mega-pixel digital image sensor to be produced on a modification of a DRAM process without the need for complex or process-sensitive analog circuitry. A mega-pixel sensor of this design, with 10 bit A/D conversion and two bits for error correction, would have approximately 26 million transistor, and might be equivalent in size to a 32 megabit DRAM. A sensor with National Television Standards Committee (NTSC) approved resolution would have approximately 8 million transistors. Note that the image can be stored and processed within the sensor, since it can behave as DRAM if desired.

This invention may find use in video cameras, where the illumination levels are typically constant during the exposure of a single frame. It may also be used in still image acquisition devices that do not use photographic strobe lights or other time-varying sources of illumination.

In addition, the invention will facilitate the implementation of "on-sensor" processing of an image. This will allow more functionality to be built into the sensor and require less support circuitry for using a sensor array, configured in accordance with the present invention, in digital imaging applications. For example, image compression circuits can be provided on the image sensor, which would reduce the amount of data that would have to be manipulated after the data is output from the sensor.

Moreover, pixel capture circuit 50 of the present invention allows simple scaling of the resolution of the sensor array as each pixel capture circuit is identical to the next and can be replicated by standard computer-aided manufacturing techniques. If necessary, several image capture circuits such as image capture circuit 30 can be combined on a single circuit to allow for applications where timing and noise considerations do not allow more pixel capture circuits such as pixel capture circuit 50 to be added to image capture circuit 30.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An imaging system comprising:
    an image sensor array having a plurality of pixel cells, each pixel cell having a multi-bit memory cell in which a plurality of data inputs are coupled to a set of bitlines, the memory cell further having a write control input;
    a counter having (1) a plurality of digital count outputs being coupled to said set of bitlines to provide each pixel cell that is coupled to said set of bitlines the same count value, and (2) a clock input to be coupled to a timing signal; and
    a delay circuit coupled to provide a delayed version of the timing signal to the write control input of the memory cell in each pixel cell that is coupled to said set of bitlines.

2. The imaging system of claim 1 wherein each pixel cell further includes a photosensor reset circuit coupled to a reset line, and the reset line is further coupled to a reset input of the counter.

3. The imaging system of claim 2 wherein each pixel cell further includes a comparator coupled to compare a photo-generated signal to a threshold level, and wherein an output of the comparator is coupled to qualify the delayed version of the timing signal to the write control input of the memory cell.

4. The imaging system of claim 3 wherein the memory cell is a dynamic random access memory (DRAM) cell.

5. The imaging system of claim 3 wherein the plurality of pixel cells are all of the constituent pixel cells of the sensor array.

6. The imaging system of claim 1 wherein the sensor array further comprises a wordline coupled between the delay circuit and the write control input of the memory cell in a pixel cell, to carry the delayed version of the timing signal.

7. A method for capturing a digital image, comprising:
    resetting a plurality of pixel cells of an image sensor array and a counter; and then
    beginning an exposure by allowing (1) each of the plurality of pixel cells to start to respond to incident light by a photo-generated signal, and (2) the counter to start counting according to a timing signal; and
    repeatedly writing an output value of the counter to a memory cell in each of the plurality of pixel cells in response to a delayed version of the timing signal, so long as the photo-generated signal in each pixel cell has not reached a threshold level.

8. The method of claim 7 wherein the plurality of pixel cells are all of the constituent cells in the image sensor array.

9. The method of claim 7 further comprising:
    reading a digital value from the memory cell in each of the plurality of pixel cells after the signal in that cell has reached the threshold level, the digital value represents the incident light detected by that cell during the exposure.

10. The method of claim 7 wherein each of the plurality of pixel cells starts to respond to incident light by increasing a voltage level of the photo-generated signal.

11. Th e method of claim 7 wherein the timing signal causes the counter to be updated at a constant rate.

12. The method of claim 7 wherein the counter is reset by clearing its output value.

13. The method of claim 7 wherein the timing signal causes the counter to be updated by counting upwards.

* * * * *

UNITED STATES PATENT AND TRADEMARK OFFICE
CERTIFICATE OF CORRECTION

PATENT NO.    : 6,330,030 B1                                           Page 1 of 1
DATED         : December 11, 2001
INVENTOR(S)   : O'Connor It is certified that error appears in the above-identified patent and that said Letters Patent is hereby corrected as shown below:

Column 6,
Line 31, delete "AID" and insert -- A / D --.

Signed and Sealed this

Seventeenth Day of September, 2002

Attest:

Attesting Officer

JAMES E. ROGAN
Director of the United States Patent and Trademark Office